UNITED STATES PATENT OFFICE.

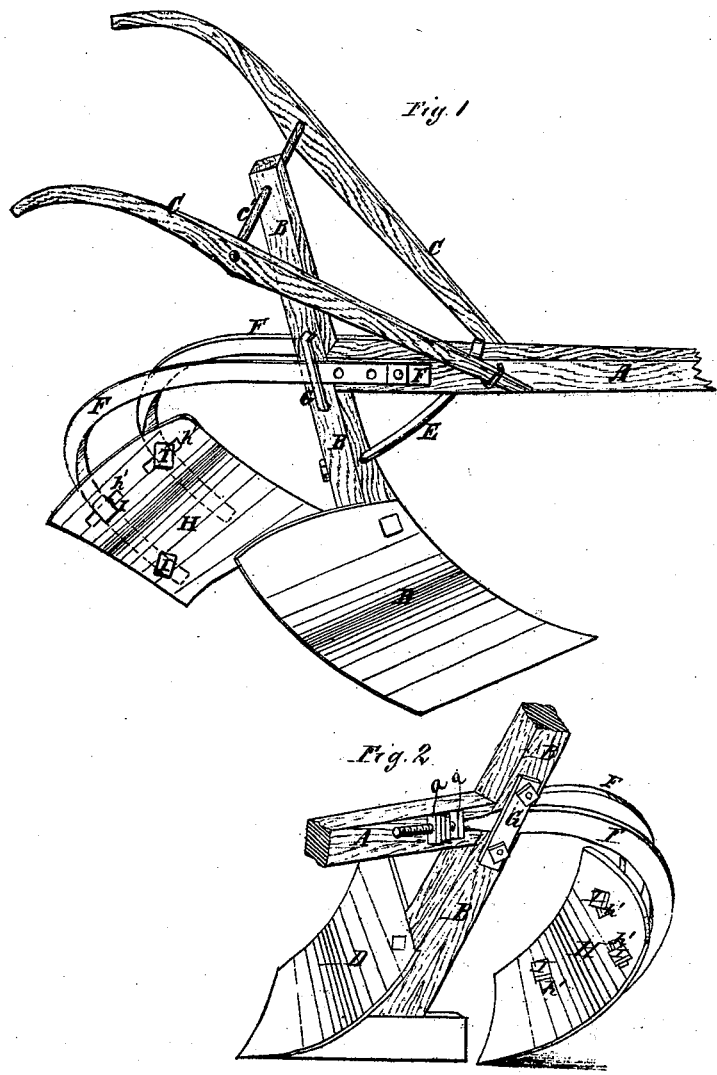

ANDREW DAY, OF CRYSTAL SPRINGS, MISSISSIPPI.

IMPROVEMENT IN PLOWS.

Specification forming part of Letters Patent No. 108,979, dated November 8, 1870.

*To all whom it may concern:*

Be it known that I, ANDREW DAY, of Crystal Springs, county of Copiah, and State of Mississippi, have invented a new and Improved Plow; and I do hereby declare that the following is a full, clear, and exact description thereof, which will enable others skilled in the art to make and use the same, reference being had to the accompanying drawings, forming part of this specification.

Figure 1 is a perspective view of my improved plow. Fig. 2 is a perspective view of the reverse side of the plow.

This invention pertains to improvements in plows such as are provided with scrapers attached in rear of the standard; and the invention consists in the construction and arrangement of parts, as specified in the claim, whereby the scraper may be adjusted higher or lower and toward or back from the standard, or at an angle to the same laterally, or in a horizontal plane, as hereinafter described.

A is the plow-beam, the rear end of which is securely attached to the standard B.

C are the handles, the forward ends of which are securely attached to the beam A. The upper parts of the handles C are supported and held in their proper relative positions by the round $c'$, which passes through and is attached to the upper end of the standard B.

D is the plow, which is securely attached to the lower end of the standard B. The draft-strain upon the standard B is sustained by the brace-rod E, the forward end of which passes through and is secured to the beam A, and the rear end of which passes through and is secured to the said standard B.

F are curved bars, the forward ends of which are secured and adjustably pivoted to the opposite sides of the rear part of the beam A by a bolt, so that the said bars may be lengthened and shortened as desired by changing the bolt in the perforations in one of the bars F and by adjusting the nuts $a\ a$ (see Fig. 2) on the screw-threaded end of the other bar, which passes through the eye of the head of the bolt. The bars F pass back through long keepers G, attached to the opposite sides of the standard B. These keepers may be loosened from or clamped upon the bars F by screw-nuts, (see Fig. 2,) and thus the bars being adjusted vertically, they will secure the same in the desired position.

It will be observed that by means of the screw-nuts $a\ a$ the scraper may be adjusted forward or back on the landside alone by reason of the corresponding adjustment of the bar F, which is on that side.

To the rear ends of the bars F, which are curved downward into proper position, is attached the plow-plate or scraper H, which is secured in place by bolts I, which pass through holes in the lower parts of the bars F, and the upper ones of which pass through horizontal slots $h'$ in the plow-plate or scraper H. One of the bars F is made longer than the other, to give the plow-plate or scraper the proper inclination, and the slots $h'$ in the plate H, through which the bars I pass, enable the plate or scraper to be adjusted according to the form desired to be given to the ridge.

Having thus described my invention, I claim as new and desire to secure by Letters Patent—

The arrangement of the curved bars F F, keepers G, screw-bolt and the nuts $a\ a$, the scraper H, provided with slots $h'$, and the bolts I, as shown and described, for the purpose specified.

ANDREW DAY.

Witnesses:
 W. C. WILKINSON,
 J. R. FERGUSON.